(12) United States Patent
Rogers (10) Patent No.: US 7,722,126 B2
(45) Date of Patent: May 25, 2010

(54) MINI SIZED SIDE DUMP TRAILER

(76) Inventor: Bobby Rogers, 610 Lakeview Dr., North Sioux City, NE (US) 57049

( * ) Notice: Subject to any disclaimer, the term of this patent is extended or adjusted under 35 U.S.C. 154(b) by 185 days.

(21) Appl. No.: 12/069,131

(22) Filed: Feb. 7, 2008

(65) Prior Publication Data

US 2009/0200500 A1    Aug. 13, 2009

(51) Int. Cl.
   *B60P 1/16* (2006.01)
(52) U.S. Cl. .......................................... 298/18
(58) Field of Classification Search ................. 298/18, 298/17.6, 22 R; 414/470; 16/263
   See application file for complete search history.

(56) References Cited

U.S. PATENT DOCUMENTS

| | | | | |
|---|---|---|---|---|
| 2,072,998 A | * | 3/1937 | Allin | 298/17.6 |
| 2,636,777 A | * | 4/1953 | Peller | 298/17.6 |
| 2,656,055 A | * | 10/1953 | Longenecker | 414/192 |
| 3,212,653 A | * | 10/1965 | Keen | 414/192 |
| 3,240,164 A | * | 3/1966 | Flowers | 105/276 |
| 3,316,019 A | * | 4/1967 | Flowers | 298/17.6 |
| 3,488,091 A | * | 1/1970 | Baker | 298/3 |
| 4,223,907 A | * | 9/1980 | Kelly | 280/408 |
| 4,391,562 A | * | 7/1983 | Hetzner | 414/483 |
| 4,494,798 A | * | 1/1985 | Bailey | 298/17.6 |
| 5,070,687 A | * | 12/1991 | Schweigert | 56/202 |
| 5,288,197 A | * | 2/1994 | Harris | 414/495 |
| 5,398,506 A | * | 3/1995 | Martin | 60/433 |
| 5,480,214 A | | 1/1996 | Rogers | |
| 6,669,304 B2 | * | 12/2003 | Binning | 298/17.7 |
| 6,688,834 B1 | * | 2/2004 | Aulick | 414/469 |
| 6,905,175 B1 | * | 6/2005 | Verros | 298/17.7 |
| 2007/0278048 A1 | * | 12/2007 | Futahashi et al. | 187/272 |

* cited by examiner

*Primary Examiner*—H Gutman
(74) *Attorney, Agent, or Firm*—Dennis L. Thomte; Thomte Patent Law Office LLC (57) ABSTRACT

A mini-sized side dump trailer comprising a wheeled frame having a pair of wheels supporting the rearward end thereof and a steerable front wheel assembly of the forward end thereof with a forwardly extending tongue extending from the front wheel assembly for connection to a small vehicle such as a utility terrain vehicle, an all terrain vehicle or a small tractor. The small side dump body may be pivoted to either the first side of the trailer or to the second side of the trailer.

2 Claims, 8 Drawing Sheets

MINI SIZED SIDE DUMP TRAILER

BACKGROUND OF THE INVENTION

1. Field of the Invention

This invention relates to a side dump trailer and more particularly to a mini-sized side dump trailer. The reduced size of the side dump trailer as compared to the existing side dump trucks and trailers makes it extremely useful for landscapers, lawn services, farms and ranches, city maintenance, state and national parks, fairgrounds, sports complexes, golf courses, camp grounds, general contractors, etc.

2. Description of the Related Art

Side dump bodies for use on trucks and trailers have become extremely popular in recent years since the introduction of the side dump trailer of applicant's grandfather, Ralph R. Rogers, which is disclosed in U.S. Pat. No. 5,480,214 and many other patents granted to applicant's grandfather. The side dump trailers of the prior art are extremely large and are not practical for smaller scale dumping needs. To applicant's knowledge, no one has previously provided a mini-sized side dump trailer which has a capacity of approximately 34 cubic feet with an additional capacity if the material in the side dump body is heaped. Further, in most prior art side dump bodies, the power for pivoting the side dump bodies from a transport position to a first side dumping position or to a second side dumping position is derived from the prime mover itself. In other words, the trailer is not self-contained. Since the small side dump trailer of this invention will be pulled by small vehicles such as an utility terrain vehicle, an all terrain vehicle, or a small tractor, some of those vehicles may not have either a hydraulic pump system or an electrical system needed to power the side dump body of the trailer.

SUMMARY OF THE INVENTION

A mini-sized side dump trailer is disclosed which is adapted to be pulled by a small vehicle such as an utility train vehicle (UTV), an all terrain vehicle (ATV) or a small tractor, is comprised of a elongated trailer frame having a forward end, a rearward end, a first side and a second side. The trailer frame includes a pair of longitudinally extending frame members which are spaced apart. A pair of wheels support the frame at the rearward end thereof and a steerable wheel assembly supports the frame at the forward end thereof. An elongated tongue extends forwardly from the steerable wheel assembly and is adapted to be secured, in a vertically adjustable manner, to the hitch of the small vehicle.

A side dump body is movably positioned on the trailer frame and has a rearward end, a forward end, a first side and a second side and includes a bottom wall, first and second side walls, a forward end wall, a rearward end wall and an open upper end. The forward end wall of the side dump body has first and second frame members secured thereto which define an inverted V-shape. The rearward end wall of the trailer frame has third and fourth frame members secured thereto which define an inverted V-shape. Longitudinally extending hinge pins are secured to the lower ends of each of the first, second, third and fourth frame members. A first pin hinge receptacle is mounted on the frame adjacent the forward end thereof at one side thereof and a second pin hinge receptacle is mounted on the frame adjacent the forward end thereof at the second side thereof. A third pin hinge receptacle is mounted on the frame adjacent the rearward end thereof at the first side thereof and a fourth pin hinge receptacle is mounted on the frame adjacent the rearward end thereof at the second side thereof. The first, second, third and fourth pin hinge receptacles are adapted to selectively receive the hinge pins therein.

Each of the hinge pin receptacles have a locking mechanism associated therewith which are moveable between locked and unlocked positions. Each of the locking mechanisms maintains the associated hinge pin in the associated hinge pin receptacle when in its locked position. Each of the locking mechanisms permit the associated hinge pin to be able to be moved out of engagement with the associated hinge pin receptacle when in its unlocked position.

A forward hydraulic cylinder is positioned forwardly of the forward end wall and has a base end pivotally secured to the frame and a rod end pivotally secured to the forward end wall. A rearward hydraulic cylinder is positioned rearwardly of the rearward end wall and has a base end pivotally secured to the frame and a rod end pivotally secured to the rearward end wall. The extension of the first and second hydraulic cylinders causes the side dump body to be pivotally moved to a first side dumping position when the first and third hinge pins are locked into the first and third hinge pin receptacles and the second and fourth hinge pins are not locked into the second and fourth hinge pin receptacles respectively by the second and fourth locking mechanisms. The extension of the first and second hydraulic cylinders causes the side dump body to be pivotally moved to a second side dumping position when the second and fourth hinge pins are locked into the second and fourth hinge pin receptacles respectively by the second and fourth locking mechanisms respectively and the first and third hinge pins are not locked into the first and third hinge pin receptacles.

A power means is secured to the trailer frame and is located between the longitudinally extending frame members. The power means includes a 12-volt DC batter, a 12-volt DC motor, a hydraulic pump, and an electronically controlled valve for controlling the operation of the first and second hydraulic cylinders. If needed, the hydraulic cylinders of the side dump trailer may be powered by the hydraulic pump systems of the small vehicle pulling the trailer. If desired, the electrically controlled valve for controlling the operation of the hydraulic cylinders may also be controlled from the small vehicle. Preferably, the valve means is radio controlled.

It is therefore, the principal object of the invention to provide a mini-sized side dump trailer.

A further object of the invention is to provide a mini-sized side dump trailer which is ideally suited for landscapers, lawn services, farms and ranches, city maintenance, state and national parks, fair grounds, sports complexes, golf courses, camp grounds, general contractors or the like.

A further object of the invention is to provide a mini-sized dump trailer which is much more maneuverable and easier to use than the conventional side dump trailers.

Still another object of the invention is to provide a mini-sized side dump trailer which has a self-contained power means for operating the movement of the side dump body.

Still another object of the invention is to provide a mini-sized side dump trailer which may be remotely radio controlled.

Still another object of the invention is to provide a mini-sized side dump trailer which is economical of manufacture, durable in use and refined in appearance.

These and other objects will be apparent to those skilled in the art.

DESCRIPTION OF THE PREFERRED EMBODIMENT

The side dump trailer of this invention is referred to generally by the of reference numeral 10 and is designed to be pulled by a small vehicle 12 such as a utility terrain vehicle, all terrain vehicle, or a small tractor. Some of the small vehicles will have their own hydraulic pump systems and their own electrical systems but the trailer 10 of this system is designed to be self-contained in that it has its own hydraulic pump system and electrical system. The trailer 10 of this invention may also be powered by the hydraulic pump system or the electrical system of the small vehicle 12.

Trailer 10 includes a wheeled frame means 14 which preferably includes a pair of longitudinally extending frame members 16 and 18 having rearward and forward ends. Normally, a plurality of cross members will be secured to and extended between the frame member 16 and 18 for stability and strengthening purposes.

Figure 5:
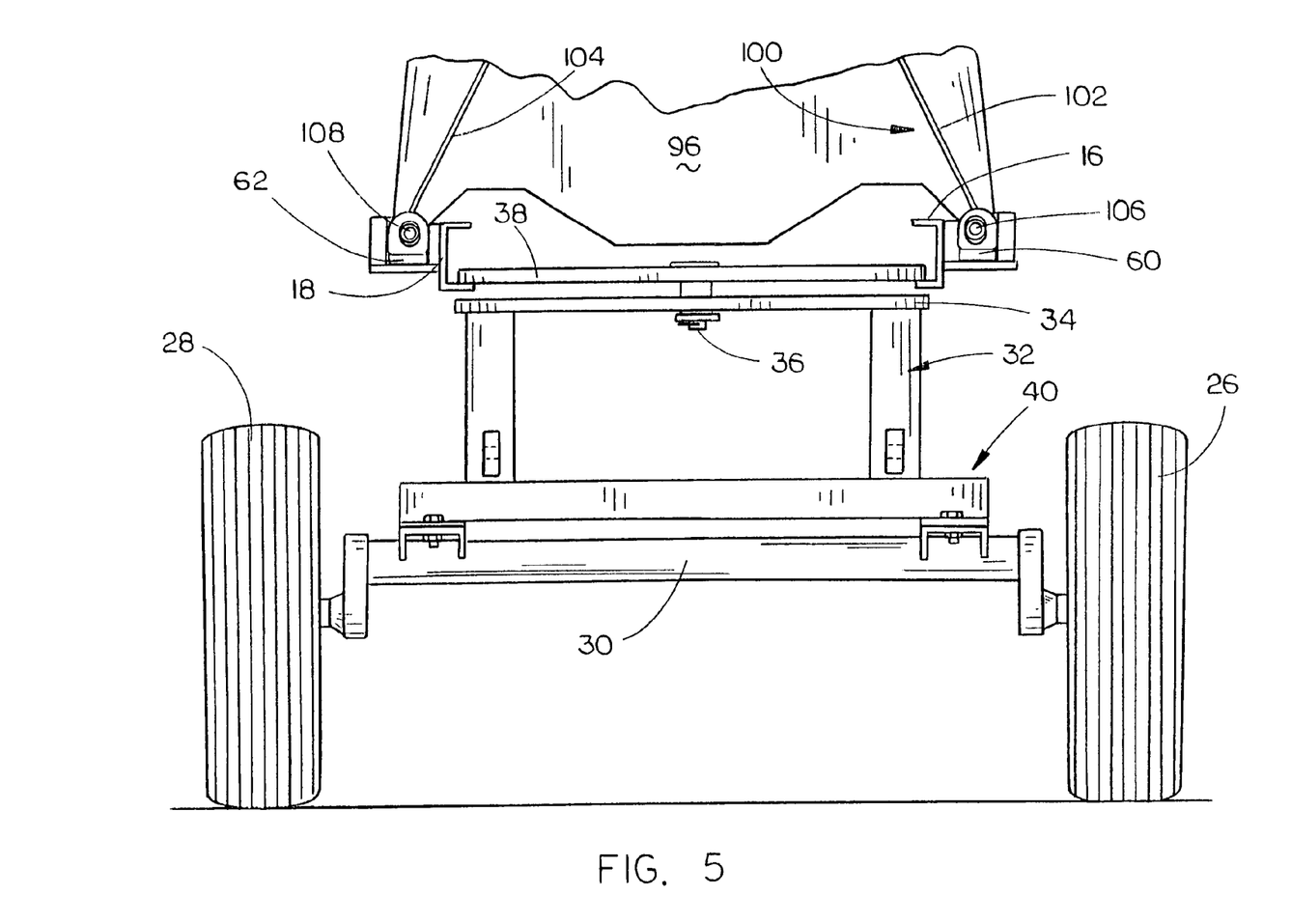
FIG. 5 is a partial rear view of the trailer of FIG. 1.

A pair of wheels 20 and 22 are secured to the opposite ends of a rear axle 24 which is secured to the rearward ends of the frame member 16 and 18 in a transversely extending manner. A pair of front wheels 26 and 28 are secured to the opposite ends of the front axle 30 as best illustrated in FIG. 5. A framework 32 is secured to axle 30 and extends upwardly therefrom adjacent the forward end of the frame means 14. Plate 34 secured to the upper end of the framework 32 and has a pivot pin 36 pivotally received in the center thereof. Plate 38 is secured by welding or the like to frame members 16 and 18 and extends therebetween as illustrated in FIG. 5. The pivot pin 36 extends through the plate 38 so that the plate 34, framework 32 and axle 30 may pivotally move with respect to the plate 38. In other words, a steerable front wheel assembly 40 is provided by this structure as illustrated in FIG. 5.

Figure 1:
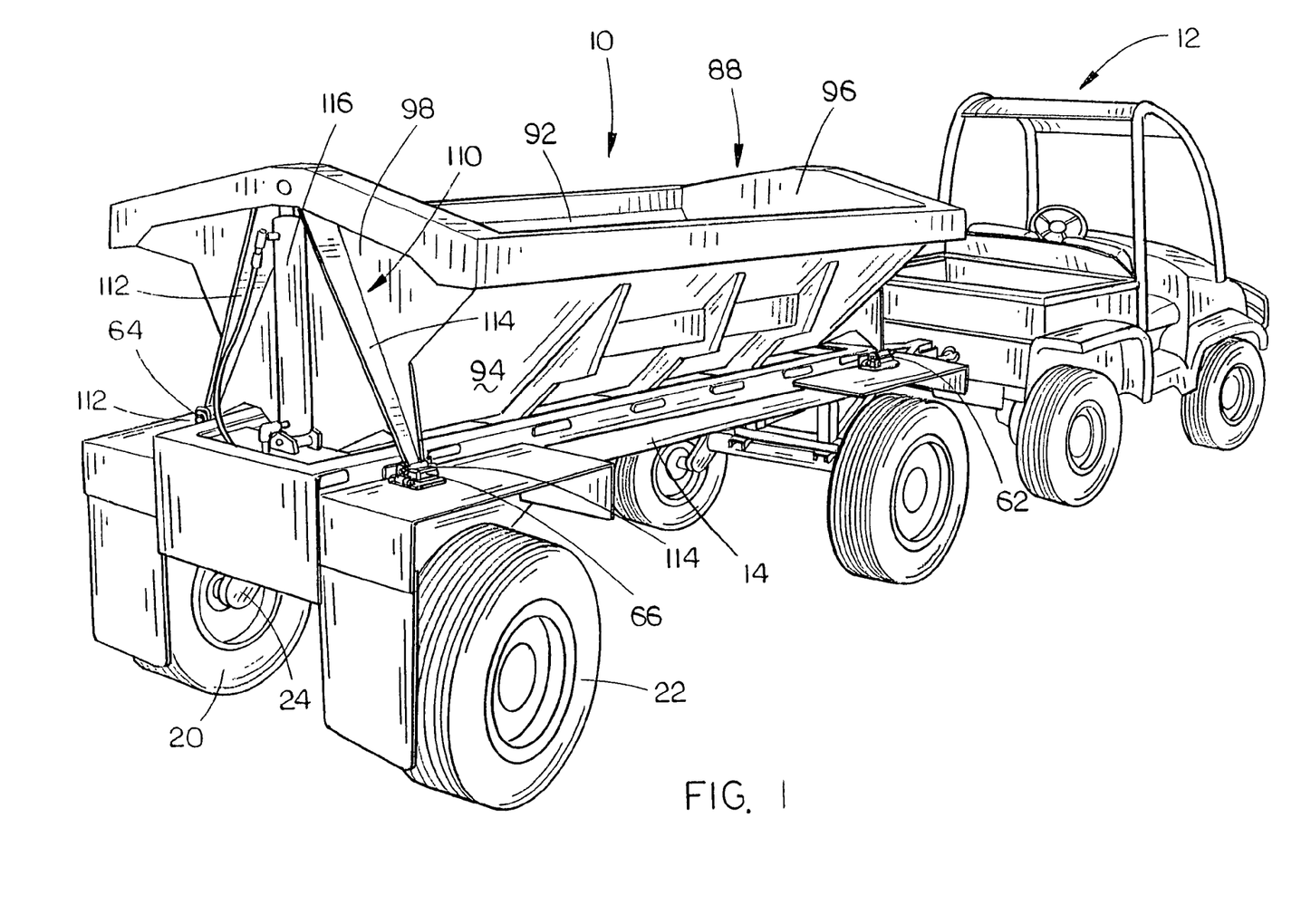
FIG. 1 is a rear prospective view of the mini-sized side dump trailer of this invention.
Figure 2:
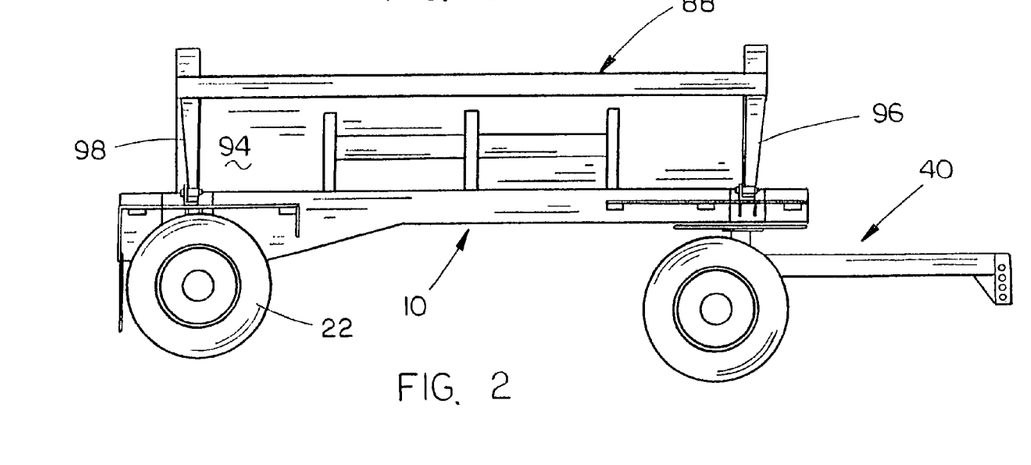
FIG. 2 is a side view of the trailer of FIG. 1.
Figure 3:
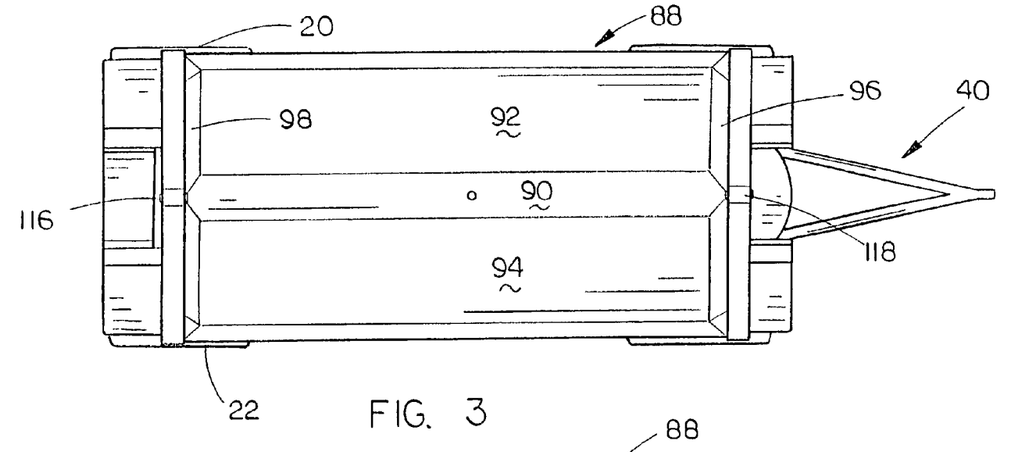
FIG. 3 is a top view of the trailer of FIG. 1.
Figure 4:
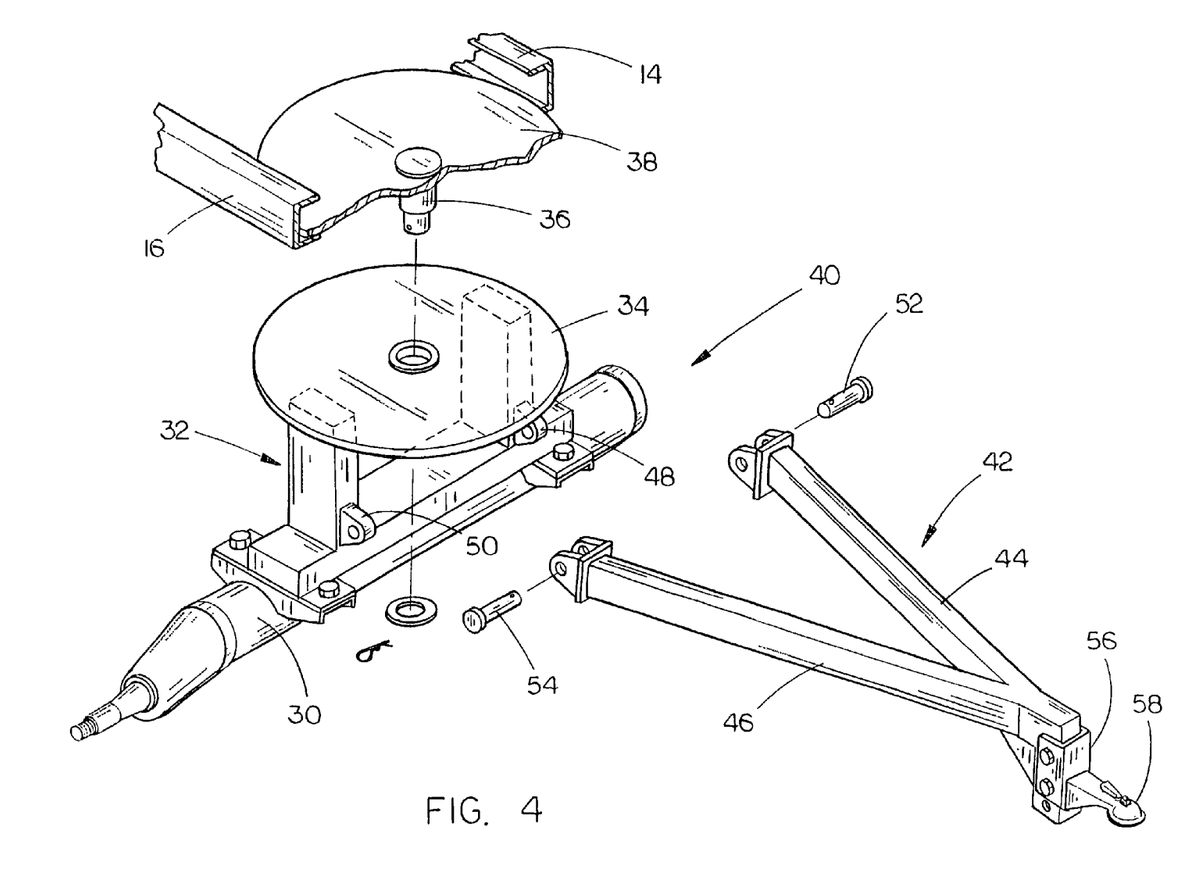
FIG. 4 is a partial exploded view of the front axle and tongue of the trailer of FIG. 1.

As seen in FIG. 4, the numeral 42 refers to a forwardly extending tongue 42 comprised of tongue members 44 and 46 which are joined together at their forward ends so as to define a V-shape. The rearward ends of tongue members 44 and 46 are pivotally secured to the brackets 48 and 50 which are secured to the framework 32 in a laterally spaced-apart manner by the pivot pins or retainer pins 52 and 54 respectively as illustrated in FIG. 4. The forward end of tongue 42 is provided with a hitch member 5E which is selectively vertically adjustably mounted to the forward end of the members 44 and 46. Preferably, a ball coupler 58 is provided for attachment to the ball hitch of the vehicle 12. The coupler 58 could be replaced by a common clevis or other conventional structure. The vertical adjustable feature of the hitch member 56 with respect to the tongue 42 enables the vertical adjustability of the hitch member 56 to accommodate different heights of hitches on the vehicles 12.

A hinge pin receptacle 60 is secured to the frame means 14 at the forward end thereof adjacent the first side thereof as illustrated in FIG. 5. Similarly, a second hinge pin receptacle 62 is secured to the forward end of frame means 14 at the second side thereof. A third hinge pin receptacle 64 is secured to the frame means 14 adjacent the rearward end thereof at the first side thereof. A fourth hinge pin receptacle 66 is secured to the frame means 14 adjacent the rearward end thereof at the second side thereof. FIG. 7 illustrates the hinge pin receptacle 62 with it being understood and noted that all of the hinge pin receptacles 60, 62, 64 and 66 are identical. As seen in FIG. 7, hinge pin receptacle 62 includes a pair of spaced-apart V-shaped recesses 68 and 70 which are sometimes referred to as saddle members in the side dump. The numerals 72, 74, 76 and 78 refer to locking mechanisms which are associated with the hinge pin receptacles 60, 62, 64 and 66 respectively to lock the hinge pins of the side dump body therein as will be described in more detail hereinafter. Each of the locking mechanisms is identical and only the locking mechanism 74 will be described in detail. Locking mechanisms 74 includes a latch 80 which is pivotally mounted on a pivot pin 82 so that the latch 80 may be moved from the unlocked position of FIG. 7 to the locked position of FIG. 6. Latch 76 has a central opening 84 formed therein which is adapted to receive one end of the associated hinge pin therein as will be described in more detail hereinafter.

Figure 6:
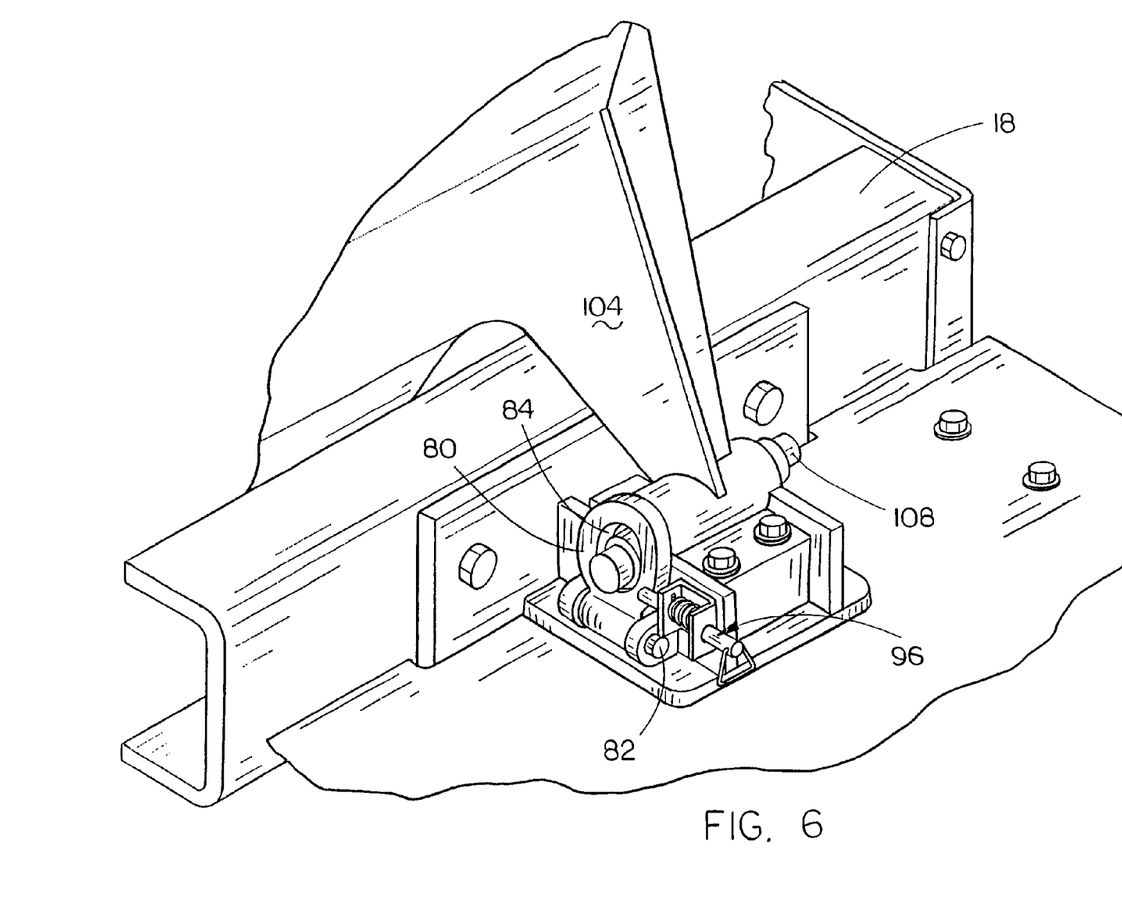
FIG. 6 is a perspective view of one of the hinge pins, hinge pin receptacles and locking mechanisms.
Figure 7:
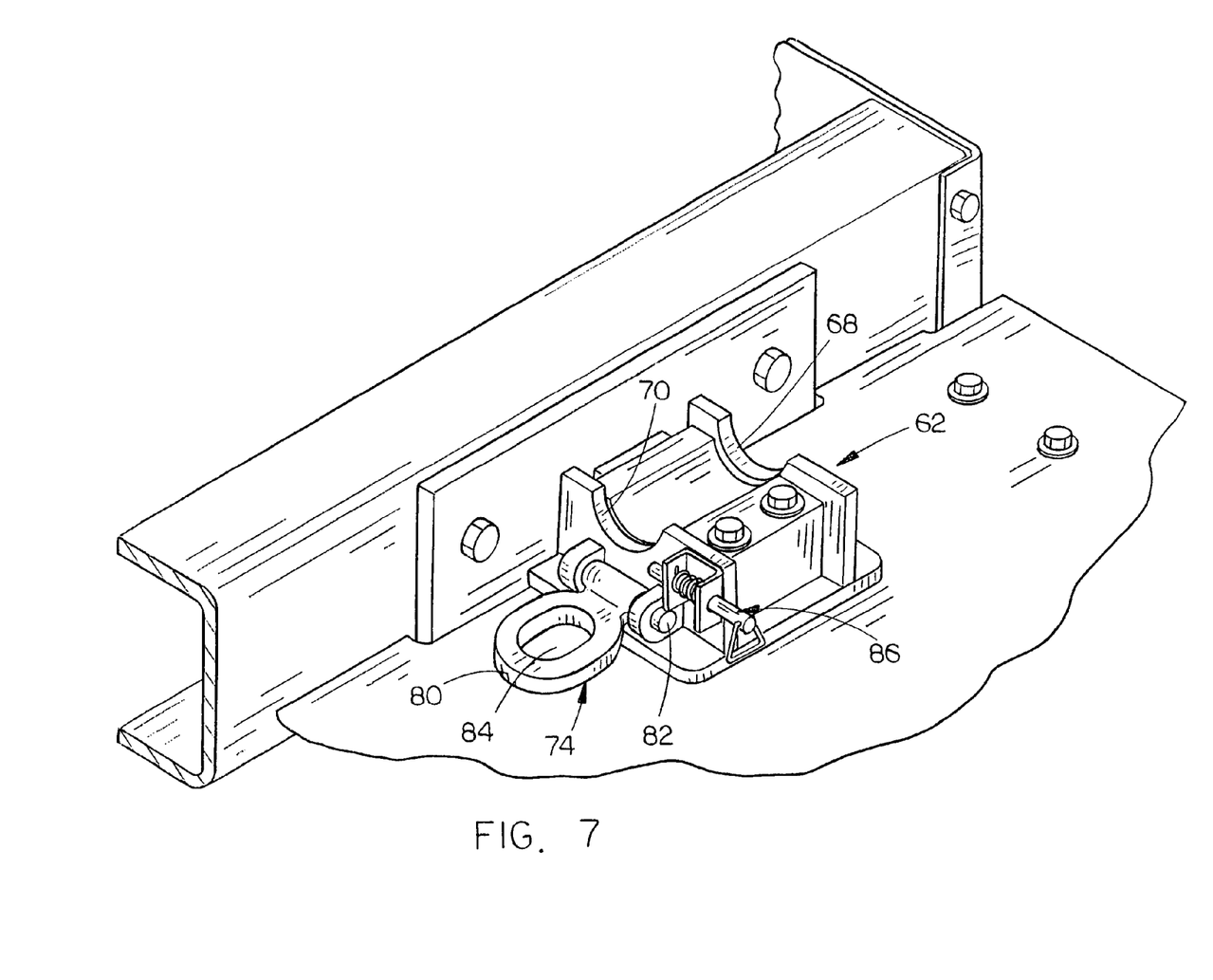
FIG. 7 is a view similar FIG. 6 except that the locking mechanism has been unlocked and the hinge pin removed from the hinge pin receptacle.

A spring loaded plunger assembly 96 is secured to the receptacle 62 and is adapted to be positioned adjacent the outer side of the latch 80 when the latch 80 is in its locked position as illustrated in FIG. 6 but which may be withdrawn so that the latch 80 may be unlocked as illustrated in FIG. 7.

The numeral 88 refers to the side dump body of this invention which includes a bottom wall 90, a first side wall 92, a second side wall 94, a forward end wall 96 and a rearward end wall 98. Forward end wall 96 includes a framework 100 secured to the forward surface thereof and which includes a pair of frame members 102 and 104 which define generally an inverted V-shape. Hinge pins 106 and 108 are secured to the lower ends of frame members 102 and 104 respectively by welding or the like. Rearward end wall 98 also has a framework 110' secured to the rearward surface thereof and which includes a pair of frame members 112' and 114' which define generally an inverted V-shape. Hinge pins 112 and 114 are secured to the lower ends of frame members 112 and 114' respectively by welding or the like.

Figure 8:
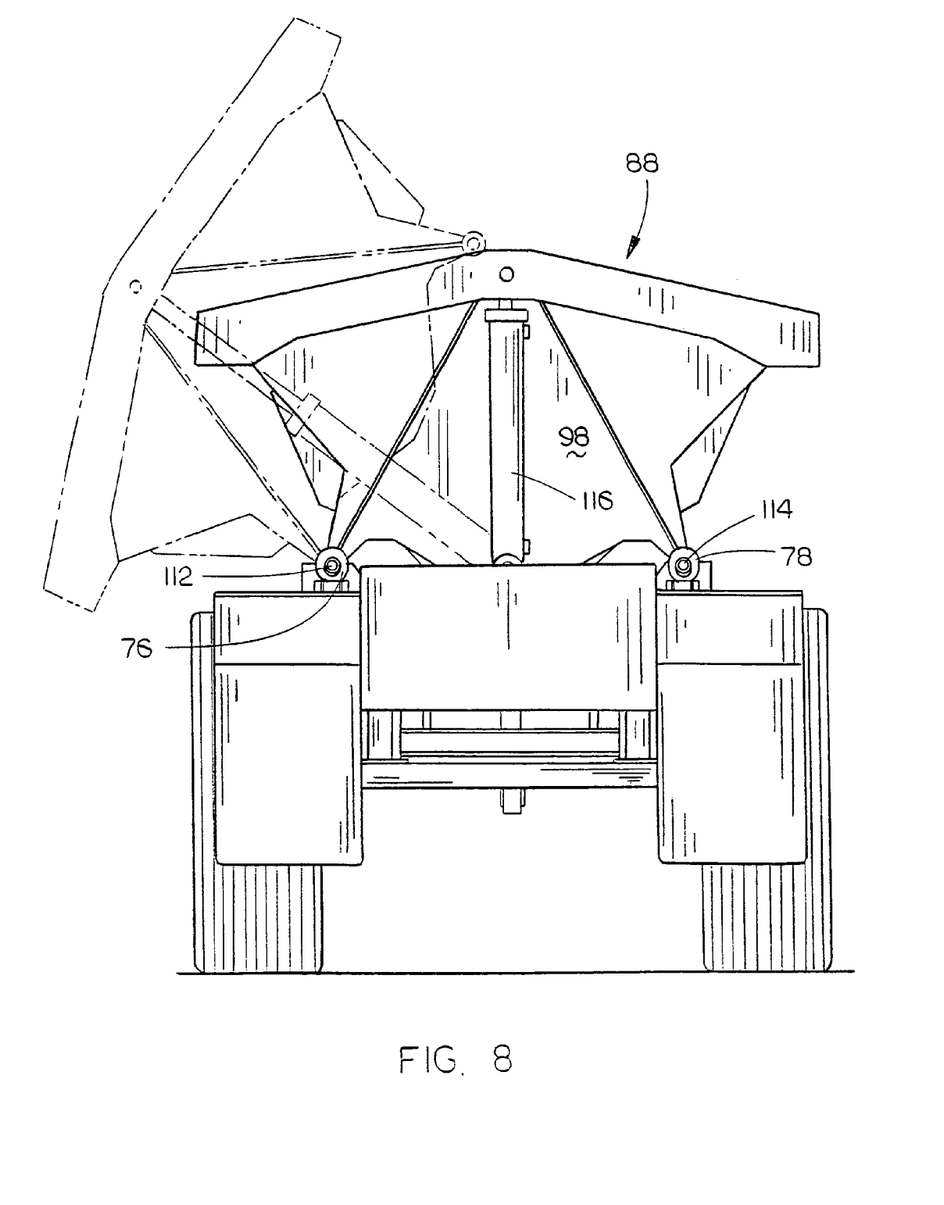
FIG. 8 is a rear view of the side dump trailer of this invention with the broken lines illustrating the side dump body having been pivoted to its first side dumping position.
Figure 9:
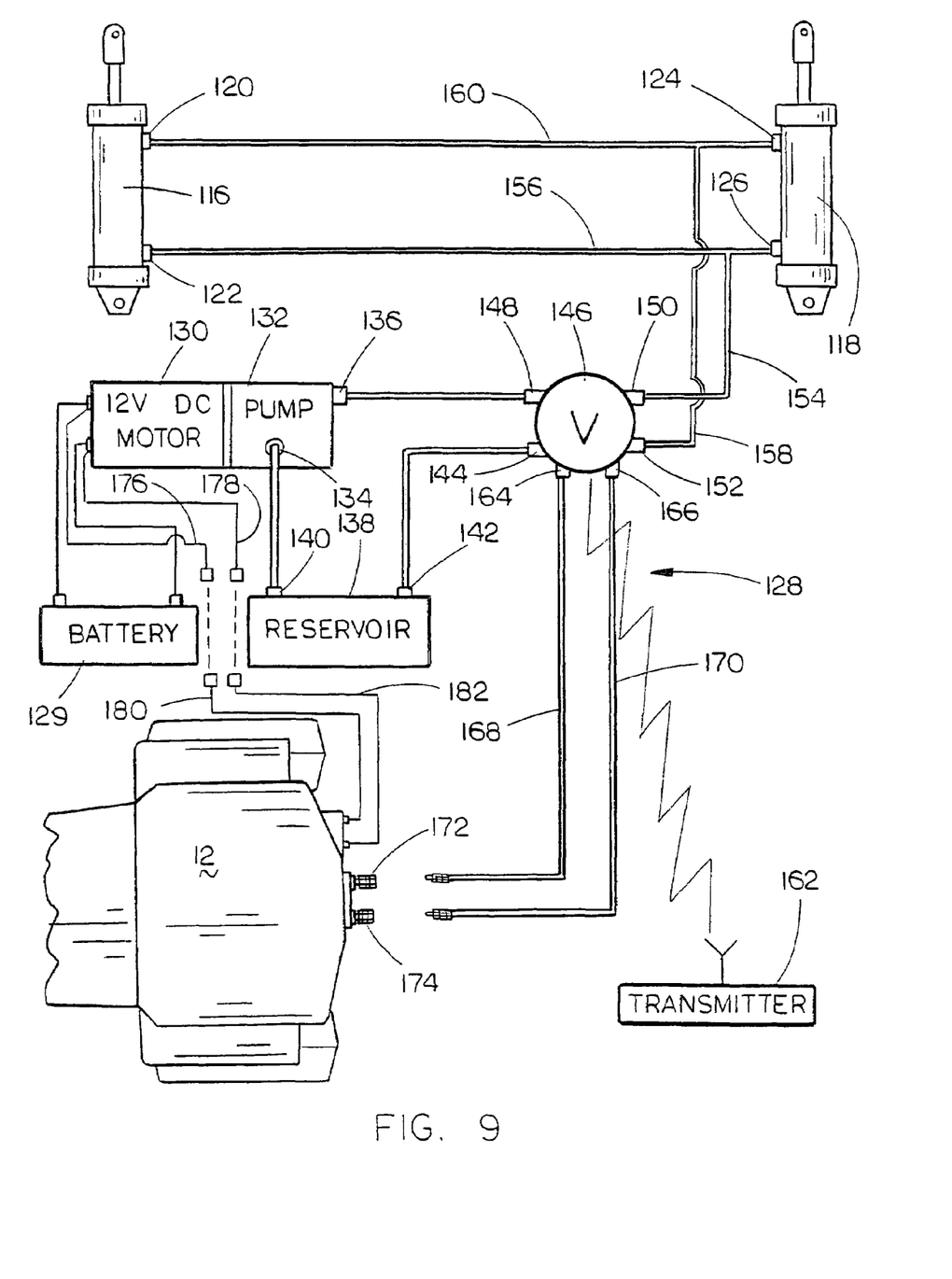
FIG. 9 is a schematic of the means for operating the hydraulic cylinders which pivot the side dump body from its transport position to its first and second side dumping positions and vice versa.

Normally, when the side dump body 88 is in its transport position, the hinge pins 106, 108, 112 and 114 will be resting upon the pivot pin receptacle 60, 62, 64 and 66 respectively and the latching devices 72, 74, 76 and 78 will be in their locked position. A rearward hydraulic cylinder 116 is secured to and extends between the frame means 14 and the upper end of rearward end wall 98. Similarly, a hydraulic cylinder 118 is pivotally secured to and extends between the frame means 14 at the forward end thereof and the upper end of the forward end wall 96 in an identical fashion to that illustrated in FIG. 8. As illustrated in FIG. 9, cylinders 116 and 118 are of the double acting type and cylinder 116 has inlet/outlet ports 120 and 122 while cylinder 118 has inlet/outlet ports 124 and 126. The power means for operating the hydraulic cylinders 116 and 118 is generally illustrated in FIG. 9 and referred to generally by the reference numeral 128. Preferably, the components of the power means 128 are secured to the frame means 14 between the frame members 116 and 118. As seen in FIG. 9, the power means 128 includes a 12-volt battery 129 which is electrically connected to a 12-volt DC motor 130 which drives a hydraulic pump 132 in conventional fashion.

Pump 132 has an inlet port 134 and an outlet or discharge port 136. Inlet port 134 of pump 132 is fluidly connected to a reservoir 138 by way of the outlet port 140 thereon. The inlet port 142 of reservoir 138 is connected to an outlet port 144 of an electronically controlled valve means 146. Outlet port 136 of pump 132 is connected to inlet port 148 of valve means 146. Valve means 146 also has an inlet/outlet port 150 and an inlet/outlet port 152. Hydraulic line 154 fluidly connects port 150 to hydraulic line 156 which is fluidly connected to ports 122 and 126 of cylinders 116 and 118 as seen in FIG. 9. Hydraulic line 158 fluidly connects inlet/outlet port 152 to line 160 which is fluidly connected to ports 120 and 124 of hydraulic cylinders 116 and 118 respectively. Valve means 146 may be radio controlled by means of the transmitter 162.

If it is desired to rely upon the hydraulic pump system of the vehicle 12, valve 146 has ports 164 and 166 provided thereon which have hydraulic lines 168 and 170 extending therefrom which may be connected to the ports or couplings 172 and 174 of the vehicle hydraulic pump system. Further, if it is desired that the motor 130 and the pump 132 be controlled by means of the vehicle electrical system, electrical leads 176 and 178 will be extended from the motor 130 to the leads 180 and 182 of the vehicle electrical system so that the battery 130 will not be needed.

The mini-size of the side dump trailer of this invention makes it extremely versatile and convenient to use. In the preferred embodiment, the side dump body of this invention has approximately a water level capacity of 34 cubic feet with several more cubic feet of heaping material capacity being possible. The vertical adjustability of the hitch member 56 enables the hitch to accommodate various sized vehicles 12. The fact that the front wheels are mounted on an axle with the tongue being connected to the axle enables the side dump trailer of this invention to be easily maneuvered. The size and maneuverability of the side dump trailer of this invention makes it ideal for landscapers, lawn services, farms and ranches, city maintenance, state and national parks, fairgrounds, sport complexes, golf courses, camp grounds, general contractors and more.

The fact that the side dump body may be dumped to either side of the trailer also makes it extremely versatile. If the operator desires to dump the contents of the side dump body 88 from the first or left side of the trailer, the locking devices 74 and 78 are unlocked and the hydraulic cylinders 116 and 118 will be extended which will cause the side dump body 88 to be pivoted from the solid line position of FIG. 8 to the broken line position of FIG. 8 as it pivots about the hinge pins 106 and 112 since the locking devices 72 and 76 will be locked. Retraction of the hydraulic cylinders 116 and 118 causes the side dump body 88 to be moved from the broken line position of FIG. 8 to the solid line position of FIG. 8.

If it is desired to dump the contents of the side dump body 88 to the second or right side of the trailer, the locking devices 72 and 76 are unlocked so that extension of the cylinders 116 and 118 will cause the side dump body 88 to pivot about the hinge pins 108 and 114 which are locked by the locking mechanisms 74 and 78.

Thus it can be seen that the novel mini-sized side dump trailer of this invention accomplishes at least all of its stated objectives.

The invention claimed is:

1. A mini-sized side dump trailer adapted to be pulled by a small vehicle, comprising:
an elongated trailer frame having a forward end, a rearward end, a first side and a second side;
a pair of wheels which support the frame at the rearward end thereof;
a steerable wheel assembly which supports the frame at the forward end thereof;
an elongated tongue having rearward and forward ends;
said tongue being secured at its rearward end to said steerable wheel assembly and extending forwardly therefrom;
said forward end of said tongue adapted to be secured to the small vehicle;
a side dump body having rearward and forward ends, a first side and a second side movably mounted on said trailer frame and including a bottom wall, first and second side walls, a forward end wall, a rearward end wall and an open upper end;
said forward end wall having first and second frames members secured thereto, having upper and lower ends, which define an inverted V-shape;
a first longitudinally extending hinge pin secured to said lower end of said first frame member;
a second longitudinally extending hinge pin secured to said lower end of said second frame member;
said rearward end wall having third and fourth frame members secured thereto, having upper and lower ends, which define an inverted V-shape;
a third longitudinally extending hinge pin secured to said lower end of said third frame member;
a fourth longitudinally extending hinge pin secured to said lower end of said fourth frame member;
a first hinge pin receptacle mounted on said frame adjacent the forward end thereof at said first side thereof;
a second hinge pin receptacle mounted on said frame adjacent the forward end thereof at said second side thereof;
a third hinge pin receptacle mounted on said frame adjacent the rearward end thereof at said first side thereof;
a fourth hinge pin receptacle mounted on said frame adjacent the rearward end thereof at said second side thereof;
said first, second, third and fourth hinge pin receptacles adapted to selectively receive said first, second, third and fourth hinge pins therein respectively;
each of said hinge pin receptacles having a locking mechanism associated therewith which is movable between locked and unlocked positions;
each of said locking mechanisms maintaining the associated hinge pin in the associated hinge pin receptacle when in its said locked position;
each of said locking mechanisms permitting the associated hinge pin in the associated hinge pin receptacle to move out of engagement therewith when in its said unlocked position;
a forward hydraulic cylinder positioned forwardly of said forward end wall and having a base end pivotally secured to said frame and a rod end pivotally secured to said forward end wall;
a rearward hydraulic cylinder positioned rearwardly of said rearward end wall and having a base end pivotally secured to said frame and a rod end pivotally secured to said rearward end wall;
the extension of said first and second hydraulic cylinder causing said side dump body to be pivotally moved to a first side dumping position when said first and third hinge pins are locked into said first and third hinge pin receptacles respectively and said second and fourth hinge pins are not locked into said second and fourth hinge pin receptacles respectively by said second and fourth locking mechanisms;
the extension of said first and second hydraulic cylinders causing said side dump body to be pivotally moved to a second side dumping position when said second and fourth hinge pins are locked into said second and fourth hinge pin receptacles respectively by said second and fourth locking mechanisms and said first and third hinge pins are not locked into said first and third hinge pin receptacles respectively;

and a power means on said frame for supplying hydraulic fluid to said hydraulic cylinders;

said power means positioned on said trailer frame;

each of said forward and rearward hydraulic cylinders having first and second inlet or outlet ports and wherein said power means includes a 12-volt DC battery, a 12-volt DC motor electrically connected to said battery, a hydraulic pump driven by said motor and having an inlet port and an outlet port, a hydraulic reservoir having an inlet port and an outlet port, said outlet port of said reservoir being fluidly connected to said inlet port of said pump, an electrically operated valve means including a first inlet port fluidly connected to said outlet port of said pump, a second inlet or outlet port, a third inlet or outlet port, and an outlet port which is fluidly connected to said inlet port of said reservoir, said second inlet or outlet port of said valve means being fluidly connected to each of said first inlet or outlet ports of said first and second hydraulic cylinders, said third inlet or outlet port being fluidly connected to each of said second inlet/outlet ports of said first and second hydraulic cylinders;

the vehicle including a hydraulic pump system;

said valve means including a fifth inlet port and a sixth outlet port which may be fluidly connected to the vehicle hydraulic pump system.

2. A mini-sized side dump trailer adapted to be pulled by a small vehicle, comprising:

an elongated trailer frame having a forward end, a rearward end, a first side and a second side;

a pair of wheels which support the frame at the rearward end thereof;

a steerable wheel assembly which supports the frame at the forward end thereof;

an elongated tongue having rearward and forward ends;

said tongue being secured at its rearward end to said steerable wheel assembly and extending forwardly therefrom;

said forward end of said tongue adapted to be secured to the small vehicle;

a side dump body having rearward and forward ends, a first side and a second side movably mounted on said trailer frame and including a bottom wall, first and second side walls, a forward end wall, a rearward end wall and an open upper end;

a first longitudinally extending hinge pin secured to said side dump body at said first side adjacent the forward end thereof;

a second longitudinally extending hinge pin secured to said side dump body at said second side adjacent the forward end thereof;

a third longitudinally extending hinge pin secured to said side dump body at said first side adjacent the rearward end thereof;

a fourth longitudinally extending hinge pin secured to said side dump body at said second side thereof adjacent the rearward end thereof;

a first hinge pin receptacle mounted on said frame adjacent the forward end thereof at said first side thereof;

a second hinge pin receptacle mounted on said frame adjacent the forward end thereof at said second side thereof;

a third hinge pin receptacle mounted on said frame adjacent the rearward end thereof at said first side thereof;

a fourth hinge pin receptacle mounted on said frame adjacent the rearward end thereof at said second side thereof;

said first, second, third and fourth hinge pin receptacles adapted to selectively receive said first, second, third and fourth hinge pins therein respectively;

each of said hinge pin receptacles having a locking mechanism associated therewith which is movable between locked and unlocked positions;

each of said locking mechanisms maintaining the associated hinge pin in the associated hinge pin receptacle when in its said locked position;

each of said locking mechanisms permitting the associated hinge pin in the associated hinge pin receptacle to move out of engagement therewith when in its said unlocked position;

a forward hydraulic cylinder positioned forwardly of said forward end wall and having a base end pivotally secured to said frame and a rod end pivotally secured to said forward end wall;

a rearward hydraulic cylinder positioned rearwardly of said rearward end wall and having a base end pivotally secured to said frame and a rod end pivotally secured to said rearward end wall;

the extension of said first and second hydraulic cylinder causing said side dump body to be pivotally moved to a first side dumping position when said first and third hinge pins are locked into said first and third hinge pin receptacles respectively and said second and fourth hinge pins are not locked into said second and fourth hinge pin receptacles respectively by said second and fourth locking mechanisms;

the extension of said first and second hydraulic cylinders causing said side dump body to be pivotally moved to a second side dumping position when said second and fourth hinge pins are locked into said second and fourth hinge pin receptacles respectively by said second and fourth locking mechanisms and said first and third hinge pins are not locked into said first and third hinge pin receptacles respectively;

a power means on said frame for supplying hydraulic fluid to said hydraulic cylinders;

each of said forward and rearward hydraulic cylinders having first and second inlet or outlet ports and wherein said power means includes a 12-volt DC battery, a 12-volt DC motor electrically connected to said battery, a hydraulic pump driven by said motor and having an inlet port and an outlet port, a hydraulic reservoir having an inlet port and an outlet port, said outlet port of said reservoir being fluidly connected to said inlet port of said pump, an electrically operated valve means including a first inlet port fluidly connected to said outlet port of said pump, a second inlet or outlet port, a third inlet or outlet port, and an outlet port which is fluidly connected to said inlet port of said reservoir, said second inlet or outlet port of said valve means being fluidly connected to each of said first inlet or outlet ports of said first and second hydraulic cylinders, said third inlet or outlet port being fluidly connected to each of said second inlet or outlet ports of said first and second hydraulic cylinders;

the vehicle including a hydraulic pump system;

said valve means including a hydraulic pump system and wherein said valve means includes a fifth inlet port and a sixth outlet port which may be fluidly connected to the vehicle hydraulic pump system.

* * * * *